（12） United States Patent
Sawado

(10) Patent No.: US 12,507,894 B2
(45) Date of Patent: Dec. 30, 2025

(54) BIOLOGICAL INFORMATION MEASUREMENT APPARATUS AND BIOLOGICAL INFORMATION MEASUREMENT SYSTEM

(71) Applicant: SEIKO EPSON CORPORATION, Tokyo (JP)

(72) Inventor: Ayae Sawado, Kai (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/607,435

(22) Filed: Mar. 16, 2024

(65) Prior Publication Data

US 2024/0306917 A1 Sep. 19, 2024

(30) Foreign Application Priority Data

Mar. 17, 2023 (JP) ................................. 2023-042747

(51) Int. Cl.
*A61B 5/00* (2006.01)
*A61B 5/024* (2006.01)
(Continued)

(52) U.S. Cl.
CPC ............ *A61B 5/0062* (2013.01); *A61B 5/024* (2013.01); *A61B 5/0261* (2013.01); *A61B 5/029* (2013.01);
(Continued)

(58) Field of Classification Search
CPC ... A61B 5/0261; A61B 5/441; A61B 5/02416; A61B 5/0059; A61B 5/0062;
(Continued)

(56) References Cited

U.S. PATENT DOCUMENTS 5,168,324 A * 12/1992 Hackel .................... H01S 3/005
356/454
5,491,552 A * 2/1996 Knuttel .............. G01N 21/4795
356/512

(Continued)

FOREIGN PATENT DOCUMENTS

JP 2022144578 A 10/2022

*Primary Examiner* — Oommen Jacob
(74) *Attorney, Agent, or Firm* — CHIP LAW GROUP

(57) ABSTRACT

A biological information measurement apparatus includes: a light emitting unit configured to emit laser light to a living body; a light transmission member configured to reflect a part of the laser light and separate the laser light into a first light beam and a second light beam; a first light receiving unit configured to detect the first light beam; and a second light receiving unit configured to detect scattered light. The light transmission member has a first surface where the laser light enters and a second surface where the laser light entering the first surface enters, and D1<D2, in which a parallel axis parallel to an intersection line between the first surface and an entering surface on which the light emitting unit and the first light receiving unit are disposed is defined as a first axis, an orthogonal axis orthogonal to the first axis on the first surface is defined as a second axis, D1 is a first diameter of the laser light along the first axis, and D2 is a second diameter of the laser light along the second axis.

5 Claims, 14 Drawing Sheets

(51) Int. Cl.
  *A61B 5/026* (2006.01)
  *A61B 5/029* (2006.01)
  *A61B 5/1455* (2006.01)
(52) U.S. Cl.
  CPC .......... *A61B 5/14552* (2013.01); *A61B 5/441* (2013.01); *A61B 5/681* (2013.01); *A61B 2562/0233* (2013.01)
(58) Field of Classification Search
  CPC ........ A61B 5/14552; A61B 2562/0233; A61B 5/02427; A61B 5/1455; A61B 5/681; A61B 5/02438
  See application file for complete search history.

(56) References Cited

U.S. PATENT DOCUMENTS

| | | | | |
|---|---|---|---|---|
| 6,015,969 | A * | 1/2000 | Nathel | G01N 21/314 250/227.27 |
| 6,381,015 | B1 * | 4/2002 | Sonehara | G01N 21/45 356/497 |
| 10,188,325 | B2 * | 1/2019 | Esenaliev | A61B 8/4227 |
| 12,193,811 | B2 * | 1/2025 | Ben Ishay | A61B 5/681 |
| 2002/0094008 | A1 * | 7/2002 | Tanaka | H01L 21/02683 372/100 |
| 2004/0160611 | A1 * | 8/2004 | Li | G01B 9/0209 356/497 |
| 2005/0030548 | A1 * | 2/2005 | Li | A61B 3/1225 356/497 |
| 2005/0180620 | A1 * | 8/2005 | Takiguchi | G06V 40/145 382/128 |
| 2005/0219526 | A1 * | 10/2005 | Peng | G01N 21/532 356/338 |
| 2006/0176448 | A1 * | 8/2006 | Van de Velde | A61B 3/102 351/221 |
| 2009/0105563 | A1 * | 4/2009 | Yajima | A61B 5/15134 606/12 |
| 2009/0185191 | A1 * | 7/2009 | Boppart | A61B 5/6852 356/479 |
| 2012/0274943 | A1 * | 11/2012 | Tumlinson | G01B 9/02058 356/451 |
| 2013/0211208 | A1 * | 8/2013 | Varadan | A61B 5/6804 600/300 |
| 2014/0221827 | A1 * | 8/2014 | Motaghiannezam | A61B 5/1128 356/479 |
| 2014/0228829 | A1 * | 8/2014 | Schmitt | A61B 18/24 606/15 |
| 2016/0058300 | A1 * | 3/2016 | Yoon | A61B 5/0295 600/480 |
| 2019/0142312 | A1 * | 5/2019 | Jun | A61B 5/1455 600/316 |
| 2020/0158615 | A1 * | 5/2020 | Shi | G01N 15/0205 |
| 2020/0201058 | A1 * | 6/2020 | Ginner | G01N 15/1436 |
| 2020/0205677 | A1 * | 7/2020 | Ito | A61B 5/7257 |
| 2020/0323438 | A1 * | 10/2020 | Sawada | G01F 1/66 |
| 2022/0296109 | A1 | 9/2022 | Eguchi et al. | |
| 2024/0306917 | A1 * | 9/2024 | Sawado | A61B 5/02438 |

* cited by examiner

BIOLOGICAL INFORMATION MEASUREMENT APPARATUS AND BIOLOGICAL INFORMATION MEASUREMENT SYSTEM

The present application is based on, and claims priority from JP Application Serial Number 2023-042747, filed Mar. 17, 2023, the disclosure of which is hereby incorporated by reference herein in its entirety.

BACKGROUND

1. Technical Field

The present disclosure relates to a biological information measurement apparatus and a biological information measurement system.

2. Related Art

Biological information measurement apparatuses that emit laser light to a living body are known. JP-A-2022-144578 discloses a biological information acquisition apparatus as an example of the biological information measurement apparatus. The biological information acquisition apparatus disclosed in JP-A-2022-144578 includes a light branching element, a first light receiving element, a second light receiving element, and a differential circuit. The light branching element is made of a light transmission material that branches the laser light. The first light receiving element receives a first light beam branched by the light branching element. The second light receiving element receives scattered light scattered by the living body. The differential circuit is coupled to the first light receiving element and the second light receiving element. The differential circuit outputs a light detection signal.

JP-A-2022-144578 is an example of the related art.

The light transmission material reflects the laser light by a front surface and a back surface. Interference light may be generated by front surface reflected light reflected by the front surface and back surface reflected light reflected by the back surface. The interference light decreases measurement accuracy of the biological information.

SUMMARY

A biological information measurement apparatus according to an aspect of the present disclosure includes: a light emitting unit configured to emit laser light to a living body; a light transmission member configured to reflect a part of the laser light and separate the laser light into a first light beam and a second light beam; a first light receiving unit configured to detect the first light beam; and a second light receiving unit configured to detect scattered light generated when the second light beam enters the living body. The light transmission member has a first surface where the laser light enters and a second surface where the laser light entering the first surface enters, and D1<D2, in which a parallel axis parallel to an intersection line between the first surface and an entering surface on which the light emitting unit and the first light receiving unit are disposed is defined as a first axis, an orthogonal axis orthogonal to the first axis on the first surface is defined as a second axis, D1 is a first diameter of the laser light along the first axis, and D2 is a second diameter of the laser light along the second axis.

A biological information measurement system according to an aspect of the present disclosure includes: a biological information measurement apparatus including a light emitting unit configured to emit laser light living body, a light transmission member configured to reflect a part of the laser light and separate the laser light into a first light beam and a second light beam, a first light receiving unit configured to detect the first light beam and generate a first detection signal, a second light receiving unit configured to detect scattered light generated when the second light beam enters the living body and generate a second detection signal, a differential circuit configured to receive the first detection signal and the second detection signal and generate an output signal, and a communication unit configured to transmit the output signal; and a control apparatus including a terminal communication unit configured to receive the output signal, and an analysis unit configured to analyze biological information of the living body using the output signal. The light transmission member has a first surface where the laser light enters and a second surface where the laser light entering the first surface enters, and D1<D2, in which a parallel axis parallel to an intersection line between the first surface and an entering surface on which the light emitting unit and the first light receiving unit are disposed is defined as a first axis, an orthogonal axis orthogonal to the first axis on the first surface is defined as a second axis, D1 is a first diameter of the laser light along the first axis, and D2 is a second diameter of the laser light along the second axis.

DESCRIPTION OF EMBODIMENTS

Figure 1:
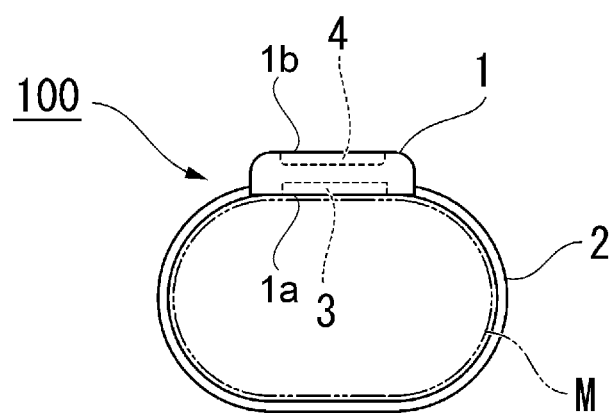
FIG. 1 is a diagram showing a schematic configuration of a measurement apparatus.

FIG. 1 shows a schematic configuration of a measurement apparatus 100. The measurement apparatus 100 measures biological information such as a blood flow, a blood volume, a blood flow rate, and a pulse, or various types of data related to the biological information. A user M corresponds to an example of a living body. The measurement apparatus 100 shown in FIG. 1 is a wristwatch type portable device worn by the user M at a measurement site. The measurement apparatus 100 is worn on a wrist of the user M. The measurement apparatus 100 is not limited to the wristwatch type. A form of the measurement apparatus 100 is not limited as long as the measurement apparatus 100 can be worn on the user M. The measurement apparatus 100 measures a blood flow, a blood volume, a blood flow rate, a pulse, and the like over time. The measurement apparatus 100 may measure biological information other than the blood flow, and the like. The measurement apparatus 100 measures, for example, a blood oxygen saturation concentration and a skin perfusion pressure. The measurement apparatus 100 includes a housing 1 and a belt 2. The housing 1 accommodates a detection unit 3 and a display unit 4. The measurement apparatus 100 corresponds to an example of a biological information measurement apparatus.

The housing 1 is an exterior accommodating units and the like provided in the measurement apparatus 100. The housing 1 has a measurement surface 1a and a display surface 1b. The measurement surface 1a is a surface facing the measurement site of the user M. At least a part of the measurement surface 1a comes into contact with the measurement site of the user M. The display surface 1b is a surface that can be visually recognized by the user M. In addition to the detection unit 3 and the display unit 4, the housing 1 accommodates a control unit 30, a memory 40, and the like to be described later. The housing 1 corresponds to an example of a case.

The belt 2 is a member that is used when the user M wears the housing 1 at the measurement site. The belt 2 is attached to, for example, a side surface of the housing 1. The belt 2 is wound around the measurement site, such that the housing 1 is worn by the user M at the measurement site. The measurement apparatus 100 shown in FIG. 1 includes the belt 2, but is not limited thereto. The measurement apparatus 100 may not include the belt 2. The measurement apparatus 100 may be worn at a chest, an arm, or the like of the user M with a tape or the like. The measurement apparatus 100 is preferably wound around the measurement site of the user M using the belt 2. When the user M wears the measurement apparatus 100 at the measurement site using the belt 2, an arrangement of a light emitting element unit 10 and a light receiving element unit 20 to be described later with respect to the user M is determined. The belt 2 corresponds to an example of a band.

The detection unit 3 is disposed on the measurement surface 1a of the housing 1. The detection unit 3 is disposed at a position facing the measurement site of the user M. The detection unit 3 acquires various types of data used when measuring the biological information.

The display unit 4 is disposed on the display surface 1b of the housing 1. The display unit 4 is formed to be capable of being visually recognized by the user M. The display unit 4 displays various types of measured biological information. The display unit 4 may display a reliability index of the biological information and information other than the biological information, such as a time. The display unit 4 may not be provided.

Figure 2:
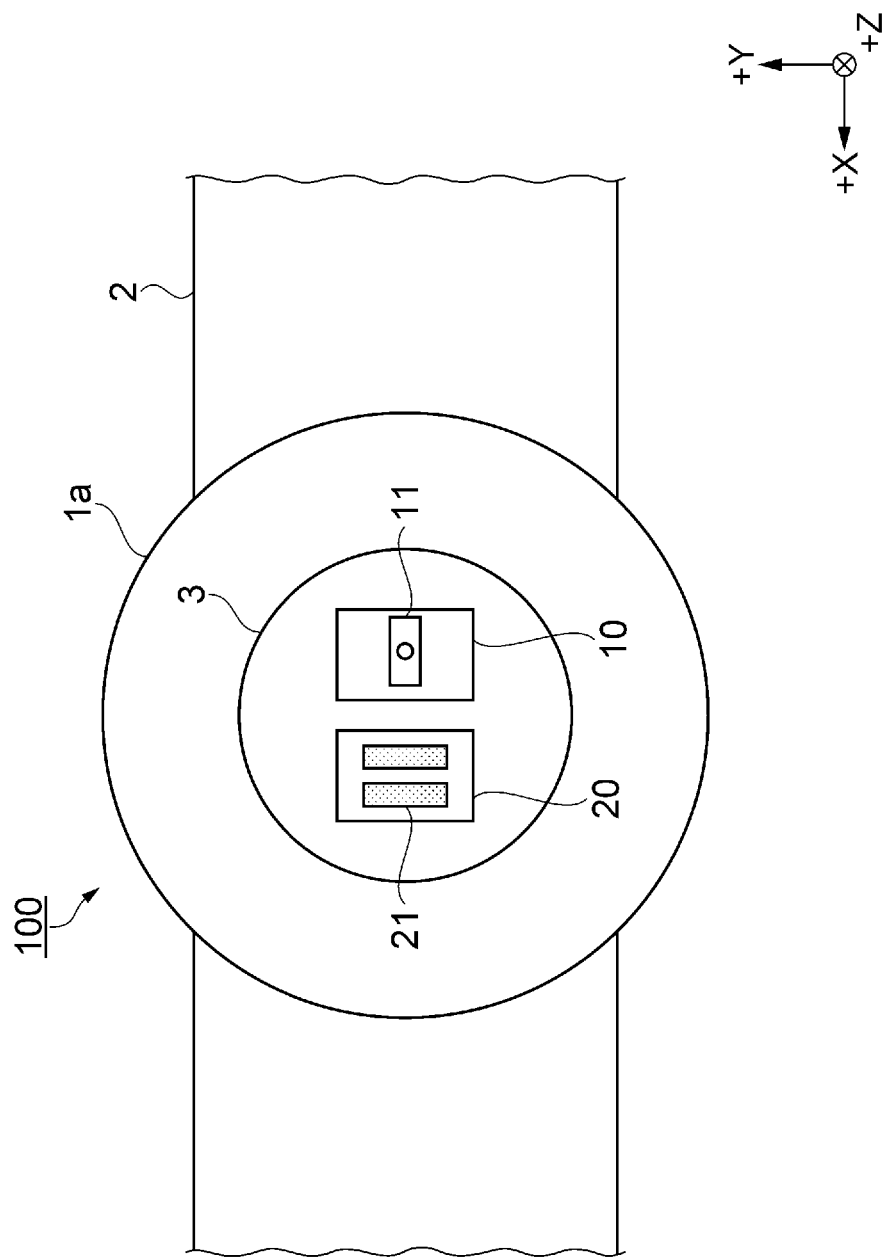
FIG. 2 is a diagram showing a schematic configuration of a measurement surface of the measurement apparatus.

FIG. 2 shows a schematic configuration of the measurement surface 1a of the measurement apparatus 100. FIG. 2 shows a schematic configuration of the measurement surface 1a of the measurement apparatus 100 when viewed from a measurement site side of the user M. The measurement surface 1a shown in FIG. 2 is formed in a circular shape, but the shape is not limited to the circular shape. The measurement surface 1a may be formed in various shapes such as a square shape and an elliptical shape. The detection unit 3 is disposed on the measurement surface 1a. The detection unit 3 includes the light emitting element unit 10 and the light receiving element unit 20. The detection unit 3 may include a temperature detection sensor, a power terminal, and the like (not shown).

A plurality of drawings including FIG. 2 show an XYZ coordinate system. An X-axis is an axis parallel to a direction in which the light emitting element unit 10 and the light receiving element unit 20 are disposed side by side. A +X direction is a direction from the light emitting element unit 10 toward the light receiving element unit 20. A −X direction is a direction from the light receiving element unit 20 toward the light emitting element unit 10. A Y-axis is an axis orthogonal to the X-axis in the measurement surface 1a. A +Y direction is a direction from a lower side to an upper side in FIG. 2. A −Y direction is a direction from the upper side to the lower side in FIG. 2. A Z-axis is an axis perpendicular to the measurement surface 1a. A +Z direction is a direction from the measurement surface 1a toward the display surface 1b. A −Z direction is a direction from the display surface 1b toward the measurement surface 1a.

The belt 2 is attached to the housing 1 of the measurement apparatus 100. The belt 2 is attached to the housing 1 parallel or substantially parallel to the X-axis. Since the belt 2 is attached to the housing 1 parallel or substantially parallel to the X-axis, the light emitting element unit 10 and the light receiving element unit 20 are disposed in a circumferential direction of the wrist of the user M. The belt 2 is preferably attached parallel or substantially parallel to an arrangement direction in which the light emitting element unit 10 including a laser light emitting element 11 and the light receiving element unit 20 including a light receiving element 21 are disposed side by side. The term "substantially parallel" means that a crossing angle between the X-axis and the arrangement direction is 5° or less. A decrease in measurement accuracy due to a movement of the user M is prevented.

The light emitting element unit 10 emits light toward the measurement site of the user M. The light emitting element unit 10 includes the laser light emitting element 11. The light emitting element unit 10 may include a light emitting element different from the laser light emitting element 11. The light emitting element different from the laser light emitting element 11 is implemented by, for example, a bare chip type or a shell type light emitting diode (LED). The light emitting element unit 10 may include a plurality of laser light emitting elements 11. The number of the laser light emitting elements 11 is appropriately set.

The laser light emitting element 11 emits laser light toward a living body. The laser light emitting element 11 is formed of a semiconductor laser. The laser light emitting element 11 is formed of, for example, a vertical resonant surface light emitting laser. A configuration of the laser light emitting element 11 is appropriately set according to a wavelength range of the emitted laser light. The laser light emitting element 11 emits laser light having a predetermined wavelength in a near infrared region. The wavelength of the emitted laser light is, for example, in a range of 800 nm to 1300 nm. A frequency of the emitted laser light is in a range of 75 THz to 400 THz. The laser light emitting element 11 corresponds to an example of a light emitting unit.

The light receiving element unit 20 receives reflected light RL and scattered light SL. The reflected light RL is light reflected by a cover glass 5 or a light branching element 27 to be described later. The reflected light RL corresponds to an example of a first light beam. The scattered light SL is light scattered by a living body. The light receiving element unit 20 receives the scattered light SL generated when the light emitting element unit 10 emits the laser light to a living body. The light receiving element unit 20 includes the light receiving element 21 that receives the reflected light RL and the scattered light SL. The light receiving element 21 includes one or more photodiodes. The photodiode is an element in which a photoelectric conversion layer is made of indium gallium arsenide (InGaAs), gallium arsenide (GaAs), silicon, or the like. The photodiode used for the light receiving element 21 is appropriately selected depending on the wavelength of light to be received. The light receiving element 21 corresponds to an example of a light receiving unit.

Figure 3:
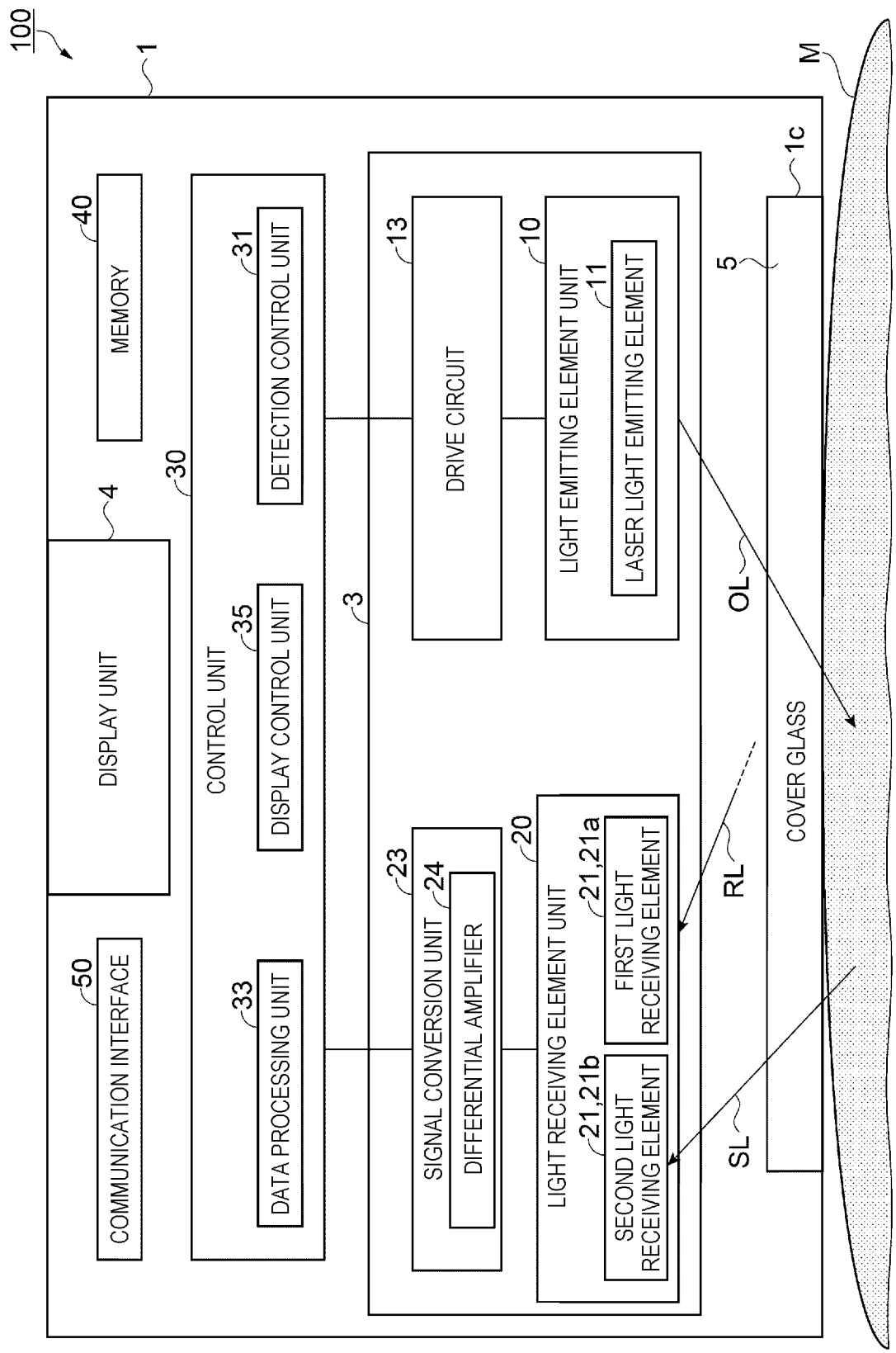
FIG. 3 is a diagram showing a block configuration of the measurement apparatus.

FIG. 3 shows a block configuration of the measurement apparatus 100. FIG. 3 shows the measurement apparatus 100 excluding the belt 2. The measurement apparatus 100 accommodates various units and the like in the housing 1. The measurement apparatus 100 includes the detection unit 3, the control unit 30, the memory 40, the display unit 4, and a communication interface 50. The housing 1 is provided with a housing opening 1c at a position facing the user M. The housing opening 1c allows the laser light emitted from the laser light emitting element 11 to transmit therethrough. The cover glass 5 may be attached to the housing opening 1c. When the cover glass 5 is not provided, the housing opening 1c allows transmitted light TL transmitted through the light branching element 27 to transmit therethrough. The housing opening 1c corresponds to an example of a passage opening. In the measurement apparatus 100 shown in FIG. 3, the cover glass 5 is provided in the housing opening 1c.

The cover glass 5 is a protective member that prevents a foreign matter such as dust from entering an inside of the housing 1. The cover glass 5 is attached to the housing 1. The cover glass 5 may or may not be attached to the housing 1. The cover glass 5 is provided at a position facing the measurement site of the user M. The cover glass 5 allows the laser light emitted from the laser light emitting element 11 to transmit therethrough. The cover glass 5 allows the scattered light SL generated at the measurement site of the user M to transmit therethrough. The scattered light SL transmitted through the cover glass 5 is received by the light receiving element 21. The cover glass 5 is made of a light transmission material such as glass. At least a part of the cover glass 5 may come into contact with the user M. When the light emitting element unit 10 does not include the light branching element 27, the cover glass 5 functions as the light branching element 27. When the cover glass 5 functions as the light branching element 27, the cover glass 5 corresponds to an example of a light transmission member. When the light emitting element unit 10 includes the light branching element 27, the cover glass 5 functions as the protective member.

The detection unit 3 is an optical sensor module that detects data related to biological information measured by using the laser light as a light detection signal. The detection unit 3 includes the light emitting element unit 10, a drive circuit 13, the light receiving element unit 20, and a signal conversion unit 23.

The light emitting element unit 10 emits laser light toward the user M. The light emitting element unit 10 includes the laser light emitting element 11. The light emitting element unit 10 may include the light branching element 27. The light emitting element unit 10 may include a shaping optical system (not shown). The shaping optical system shapes a shape of a spot LS of the laser light. The laser light emitting element 11 emits the laser light to the user M as emitted light OL. The emitted light OL is transmitted through the housing opening 1c or the cover glass 5 attached to the housing opening 1c, so that the user M is irradiated with the emitted light OL.

The drive circuit 13 drives the laser light emitting element 11. The drive circuit 13 causes the laser light emitting element 11 to emit light under the control of the control unit 30. The drive circuit 13 controls a light emission timing, a light emission time, a light emission amount, and the like of the laser light emitting element 11. The drive circuit 13 may control the wavelength of the laser light emitted from the laser light emitting element 11, a size of the spot LS of the laser light, and the like.

The light receiving element unit 20 receives reflected light RL and scattered light SL. The scattered light SL is generated when the light emitting element unit 10 emits the laser light toward the user M. The scattered light SL is generated when the transmitted light TL transmitted through at least one of the cover glass 5 and the light branching element 27 enters the measurement site of the user M. The light receiving element unit 20 includes a first light receiving element 21a, a second light receiving element 21b, and a condenser lens 25 to be described later. The light receiving element unit 20 may include a beam splitter, a prism, and the like.

The first light receiving element 21a receives the reflected light RL. A reflected light frequency fr which is a frequency of the reflected light RL is the same as an emitted light frequency f0 which is a frequency of the emitted light OL. The first light receiving element 21a receives light having the frequency f0. The first light receiving element 21a receives the reflected light RL and converts the reflected light RL into a first electric signal. The first light receiving element 21a transmits the first electric signal to the signal conversion unit 23. The first light receiving element 21a corresponds to an example of a first light receiving unit. The first electric signal corresponds to an example of a first detection signal.

The second light receiving element 21b receives the scattered light SL. The scattered light SL includes first component light obtained by the transmitted light TL being diffusely reflected by stationary tissue, and second component light obtained by the transmitted light TL being diffusely reflected by red blood cells moving in a capillary vessel. A first frequency f1, which is a frequency of the first component light, is the same as the emitted light frequency f0 of the emitted light OL emitted from the laser light emitting element 11. As compared with the emitted light frequency f0, a second frequency f2, which is a frequency of the second component light, fluctuates due to a Doppler effect according to a moving speed of the red blood cells. As compared with the emitted light frequency f0, the second frequency f2 fluctuates by a frequency shift amount proportional to the moving speed of the red blood cells. The second light receiving element 21b detects a light beat signal reflecting the frequency shift amount. The second light receiving element 21b receives the scattered light SL including the light beat signal and converts the scattered light SL into a second electric signal. The second light receiving element 21b transmits the second electric signal to the signal conversion unit 23. The second light receiving element 21b corresponds to an example of a second light receiving unit. The second electric signal corresponds to an example of a second detection signal.

The first light receiving element 21a and the second light receiving element 21b may be implemented by different photodiodes or may be implemented by one photodiode, respectively. The photodiode is divided into a plurality of light receiving regions, and each of the plurality of light receiving regions functions as the first light receiving element 21a and the second light receiving element 21b. The light receiving element unit 20 may include an element that receives light different from the laser light.

The signal conversion unit 23 receives the first electric signal and the second electric signal transmitted from the light receiving element unit 20. The signal conversion unit 23 generates a light detection signal using the first electric signal and the second electric signal, and transmits the light detection signal to the control unit 30. The light detection signal includes the light beat signal. The signal conversion unit 23 includes a differential amplifier 24. The signal conversion unit 23 may include an extraction circuit, an analog-to-digital conversion circuit, and the like. The extraction circuit extracts an AC component from the electric signal. The analog-to-digital conversion circuit converts an analog signal into a digital signal. The light detection signal corresponds to an example of an output signal.

The differential amplifier 24 receives the first electric signal and the second electric signal. The differential amplifier 24 amplifies a differential voltage between the first electric signal and the second electric signal with a constant coefficient. The differential amplifier 24 outputs the amplified differential voltage. By outputting the differential voltage, the differential amplifier 24 extracts a signal corresponding to the second component light that fluctuates due to the Doppler effect. The differential amplifier 24 generates the light detection signal using the first electric signal and the second electric signal. The differential amplifier 24 corresponds to an example of a differential circuit.

The control unit 30 is a controller that controls operations of various units. The control unit 30 is, for example, a processor including a central processing unit (CPU). The control unit 30 is implemented by one or more processors. The control unit 30 may be implemented by a field-programmable gate array (FPGA) or an application specific integrated circuit (ASIC). The control unit 30 may include a semiconductor memory such as a random access memory (RAM) or a read only memory (ROM). The semiconductor memory functions as a work area of the control unit 30. The control unit 30 functions as a detection control unit 31, a data processing unit 33, and a display control unit 35 by executing a control program stored in the memory 40. The detection control unit 31, the data processing unit 33, and the display control unit 35 are functional units. The control unit 30 controls the light emitting element unit 10 and the light receiving element unit 20 by each functional unit.

The detection control unit 31 controls the light emitting element unit 10 and the light receiving element unit 20. The detection control unit 31 controls driving of the laser light emitting element 11 via the drive circuit 13. The detection control unit 31 adjusts the light emission timing, an emission intensity, an emission pattern, and the like of the laser light emitting element 11. The detection control unit 31 controls the light receiving element 21. The detection control unit 31 adjusts a light reception timing of the light receiving element 21, an output timing of the first electric signal and the second electric signal, and the like.

The data processing unit 33 calculates biological information using the light detection signal. The data processing unit 33 performs frequency analysis such as fast Fourier transform on the light detection signal. The data processing unit 33 calculates an intensity spectrum from the light detection signal by performing the frequency analysis. The data processing unit 33 calculates a blood volume, a blood flow, and the like from the intensity spectrum. The blood volume is an index related to the number of red blood cells per unit volume. The blood volume is an index related to a blood volume of the user M. The blood flow is a volume of blood moving in an artery per unit time. The blood flow is an index related to the blood flow of the user M. The data processing unit 33 may calculate a blood pressure or the like using the blood flow. The data processing unit 33 may calculate a pulse or the like using the light detection signal. The data processing unit 33 outputs the biological information such as the blood volume and the blood flow to the display control unit 35. The data processing unit 33 may transmit the biological information such as the blood volume and the blood flow to the memory 40, the communication interface 50, and the like. The data processing unit 33 corresponds to an example of a calculation unit.

The display control unit 35 controls display of the display unit 4. The display control unit 35 causes the display unit 4 to display various images by transmitting display data to the display unit 4. The display control unit 35 acquires the biological information from the data processing unit 33 at a predetermined timing. The display control unit 35 generates display data including the blood volume and the like. The display control unit 35 may generate display data including a blood pressure and the like. The display control unit 35 outputs the display data to the display unit 4. The display control unit 35 causes the display unit 4 to display the biological information based on the display data.

The memory 40 stores various data. The memory 40 stores control data for operating various units, various data measured by the control unit 30, and the like. The memory 40 stores various calculation data used in the data processing unit 33. The memory 40 may store the biological information measured by the data processing unit 33. The memory 40 stores a control program that operates in the control unit 30. The memory 40 includes a ROM, a RAM, and the like.

The communication interface 50 is an interface circuit communicably connected with a tablet terminal 200. The communication interface 50 is connected to the tablet terminal 200 in a wired or wireless manner according to a predetermined protocol. The communication interface 50 includes, for example, a connection port for wired communication, an antenna for wireless communication, and the like. The communication interface 50 receives control data, information related to the user M, and the like from the tablet terminal 200. The communication interface 50 transmits various biological information to the tablet terminal 200. The communication interface 50 may transmit measurement data such as the light detection signal. The communication interface 50 may be communicably connected to an external apparatus other than the tablet terminal 200. The communication interface 50 corresponds to an example of a communication unit.

Figure 4:
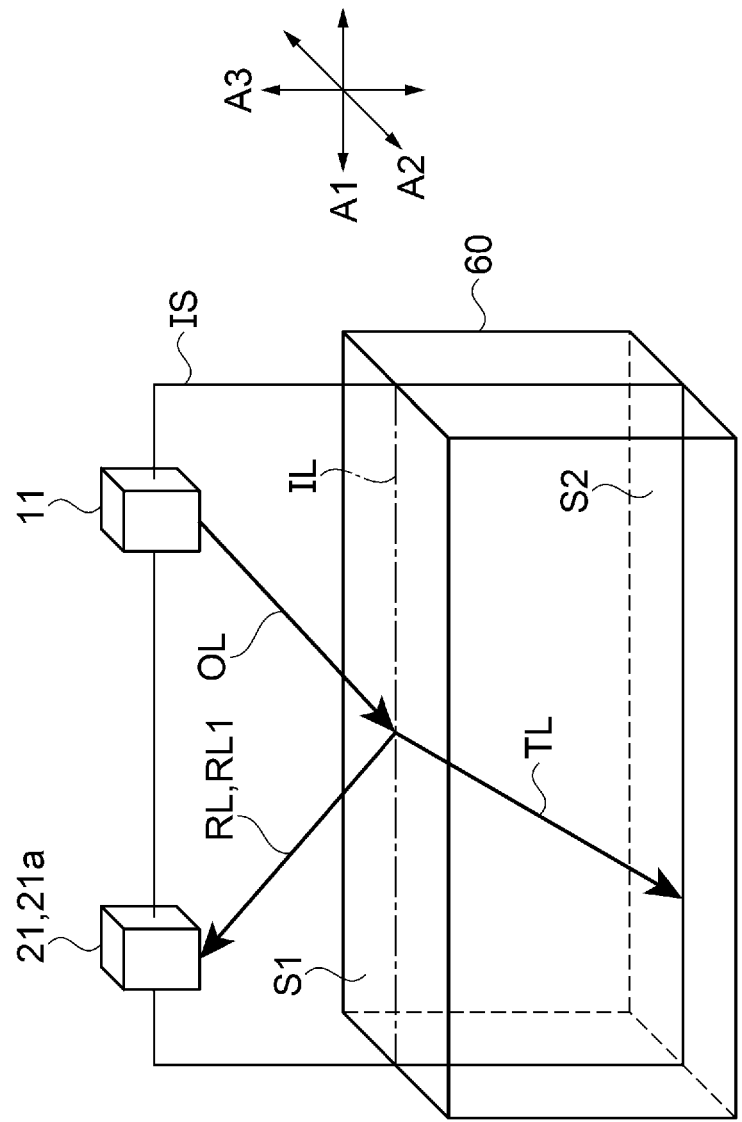
FIG. 4 is a diagram showing a schematic configuration of laser light emitted from a light emitting element unit.

FIG. 4 shows a schematic configuration of the laser light emitted from the light emitting element unit 10. FIG. 4 is a perspective view of the laser light emitting element 11, the light receiving element 21, and a glass member 60. The glass member 60 represents the cover glass 5 or the light branching element 27. FIG. 4 shows an entering surface IS. The entering surface IS is a virtual surface on which the laser light emitting element 11 and the first light receiving element 21a are disposed. In FIG. 4, the user M is omitted. The measurement site of the user M is located below the glass member 60. The glass member 60 represents the light transmission member.

The emitted light OL is the laser light emitted from the laser light emitting element 11. The emitted light OL is emitted toward the user M. The emitted light OL enters an inside of the glass member 60 from a front surface S1 of the glass member 60. The front surface S1 is a surface where the emitted light OL enters. The front surface S1 is a surface facing the laser light emitting element 11. The front surface S1 is a surface of the cover glass 5 or the light branching element 27 where the laser light enters. The front surface S1 corresponds to an example of a first surface.

The transmitted light TL entering the inside of the glass member 60 passes through the inside of the glass member 60. The transmitted light TL that reaches a back surface S2 of the glass member 60 transmits through the back surface S2, and the measurement site of the user M is irradiated with the transmitted light TL. The back surface S2 is a surface where the transmitted light TL entering the front surface S1 enters. The back surface S2 is a surface where the laser light entering the front surface S1 of the cover glass 5 or the light branching element 27 enters. The back surface S2 corresponds to an example of a second surface.

A part of the emitted light OL is reflected by the front surface S1 of the glass member 60. Front surface reflected light RL1 reflected by the front surface S1 moves toward the first light receiving element 21a. The front surface reflected light RL1 is an example of the reflected light RL. The front surface reflected light RL1 is received by the first light receiving element 21a.

The emitted light OL and the front surface reflected light RL1 pass through the entering surface IS. The entering surface IS intersects the front surface S1. The entering surface IS and the front surface S1 intersect at an intersection line IL. Here, a parallel axis parallel to the intersection line IL is referred to as a first optical axis A1. An orthogonal axis orthogonal to the intersection line IL on the front surface S1 is referred to as a second optical axis A2. A vertical axis orthogonal to the front surface S1 is referred to as a third optical axis A3. The first optical axis A1 corresponds to an example of a first axis. The second optical axis A2 corresponds to an example of a second axis.

First Embodiment

A first embodiment shows an optical configuration in which the detection unit 3 including the light branching element 27 detects the light detection signal. In the first embodiment, the first light receiving element 21a receives the reflected light RL reflected by the light branching element 27. In the first embodiment, the cover glass 5 may or may not be provided. The first light receiving element 21a does not receive cover glass reflected light reflected by the cover glass 5.

Figure 5:
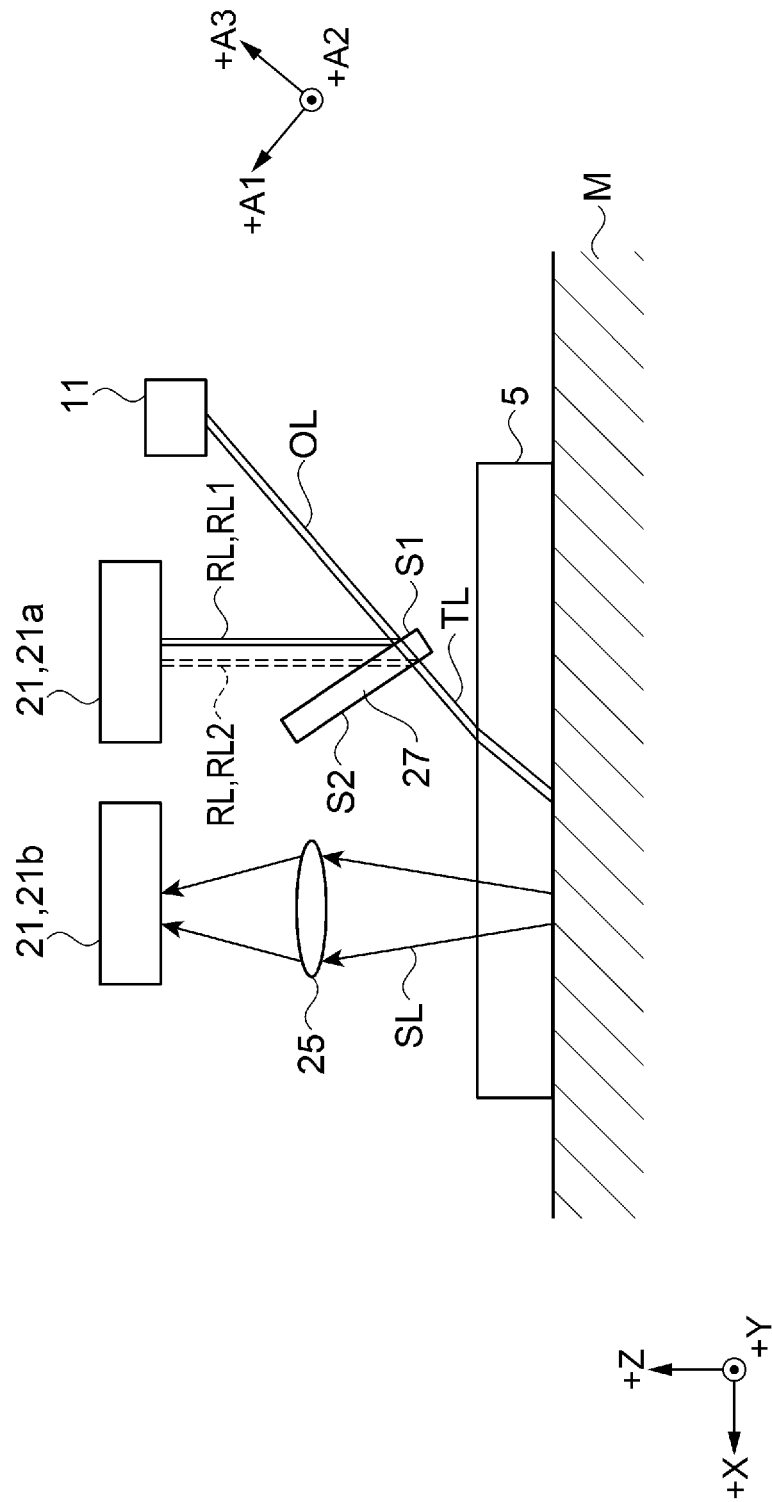
FIG. 5 is a diagram showing an outline of an optical measurement performed by a detection unit.

FIG. 5 shows an outline of an optical measurement performed by the detection unit 3. FIG. 5 shows the cover glass 5, the laser light emitting element 11, the first light receiving element 21a, the second light receiving element 21b, the condenser lens 25, and the light branching element 27. FIG. 5 shows the reflected light RL, the transmitted light TL, and the scattered light SL when the laser light emitting element 11 emits the emitted light OL toward the user M. FIG. 5 shows the emitted light OL, the reflected light RL, the transmitted light TL, and the scattered light SL on the entering surface IS. The laser light emitting element 11, the first light receiving element 21a, and the second light receiving element 21b are arranged along the X-axis. An arrangement direction of the laser light emitting element 11, the first light receiving element 21a, and the second light receiving element 21b is parallel to the X-axis.

The emitted light OL is emitted toward the measurement site of the user M by the laser light emitting element 11. The emitted light OL enters the light branching element 27. The emitted light OL is separated into the reflected light RL and the transmitted light TL by the light branching element 27. The emitted light OL is reflected by the front surface S1 and the back surface S2 of the light branching element 27.

The reflected light RL is light obtained by the emitted light OL being reflected by the light branching element 27. The reflected light RL includes the front surface reflected light RL1 and back surface reflected light RL2. The reflected light RL is reflected in the +Z direction. The reflected light RL is reflected toward the first light receiving element 21a. The reflected light RL is received by the first light receiving element 21a.

The front surface reflected light RL1 is light obtained by the emitted light OL being reflected by the front surface S1 of the light branching element 27. The front surface reflected light RL1 is generated by a part of the emitted light OL being reflected by the front surface S1. The front surface reflected light RL1 is reflected toward the first light receiving element 21a. The front surface reflected light RL1 is received by the first light receiving element 21a.

The back surface reflected light RL2 is light obtained by the emitted light OL entering the front surface S1 being reflected by the back surface S2 of the light branching element 27. The back surface reflected light RL2 is generated by a part of the transmitted light TL entering the front surface S1 being reflected by the back surface S2. The back surface reflected light RL2 is reflected toward the first light receiving element 21a. The back surface reflected light RL2 passes through an inside of the light branching element 27. The back surface reflected light RL2 is emitted to an outside from the front surface S1. The back surface reflected light RL2 is received by the first light receiving element 21a.

The transmitted light TL is light transmitted from the light branching element 27. The transmitted light TL is emitted toward the measurement site of the user M. The transmitted light TL shown in FIG. 5 transmits through the cover glass 5, and the measurement site of the user M is irradiated with the transmitted light TL. When the cover glass 5 is not provided, the transmitted light TL passes through the housing opening 1c, and the measurement site of the user M is irradiated with the transmitted light TL. The transmitted light TL corresponds to an example of a second light beam.

When the transmitted light TL enters the cover glass 5, the cover glass reflected light is generated. The cover glass reflected light is light reflected by a surface of the cover glass 5. The cover glass reflected light is preferably not received by the first light receiving element 21a. The first light receiving element 21a and the light branching element 27 are provided at positions where the first light receiving element 21a does not receive the cover glass reflected light.

The scattered light SL is generated by the measurement site of the user M being irradiated with the transmitted light TL. The scattered light SL is light reflected by living body tissue or red blood cells of the user M. The scattered light SL passes through the cover glass 5 or the housing opening 1c. The scattered light SL is condensed by the condenser lens 25. The condensed scattered light SL is received by the second light receiving element 21b.

The condenser lens 25 condenses the scattered light SL. The condenser lens 25 condenses the scattered light SL to increase a light intensity of the scattered light SL. FIG. 5 shows one condenser lens 25, but the present disclosure is not limited thereto. A plurality of condenser lenses 25 may be provided on an optical path of the scattered light SL.

The second light receiving element 21b receives the scattered light SL. The second light receiving element 21b receives the scattered light SL condensed by the condenser lens 25. The second light receiving element 21b generates the second electric signal by receiving the scattered light SL.

When the cover glass 5 is attached to the housing opening 1c, the second light receiving element 21b preferably does not receive the cover glass reflected light. A light shielding member that prevents the second light receiving element 21b from receiving the cover glass reflected light may be provided between the cover glass 5 and the second light receiving element 21b.

Figure 6:
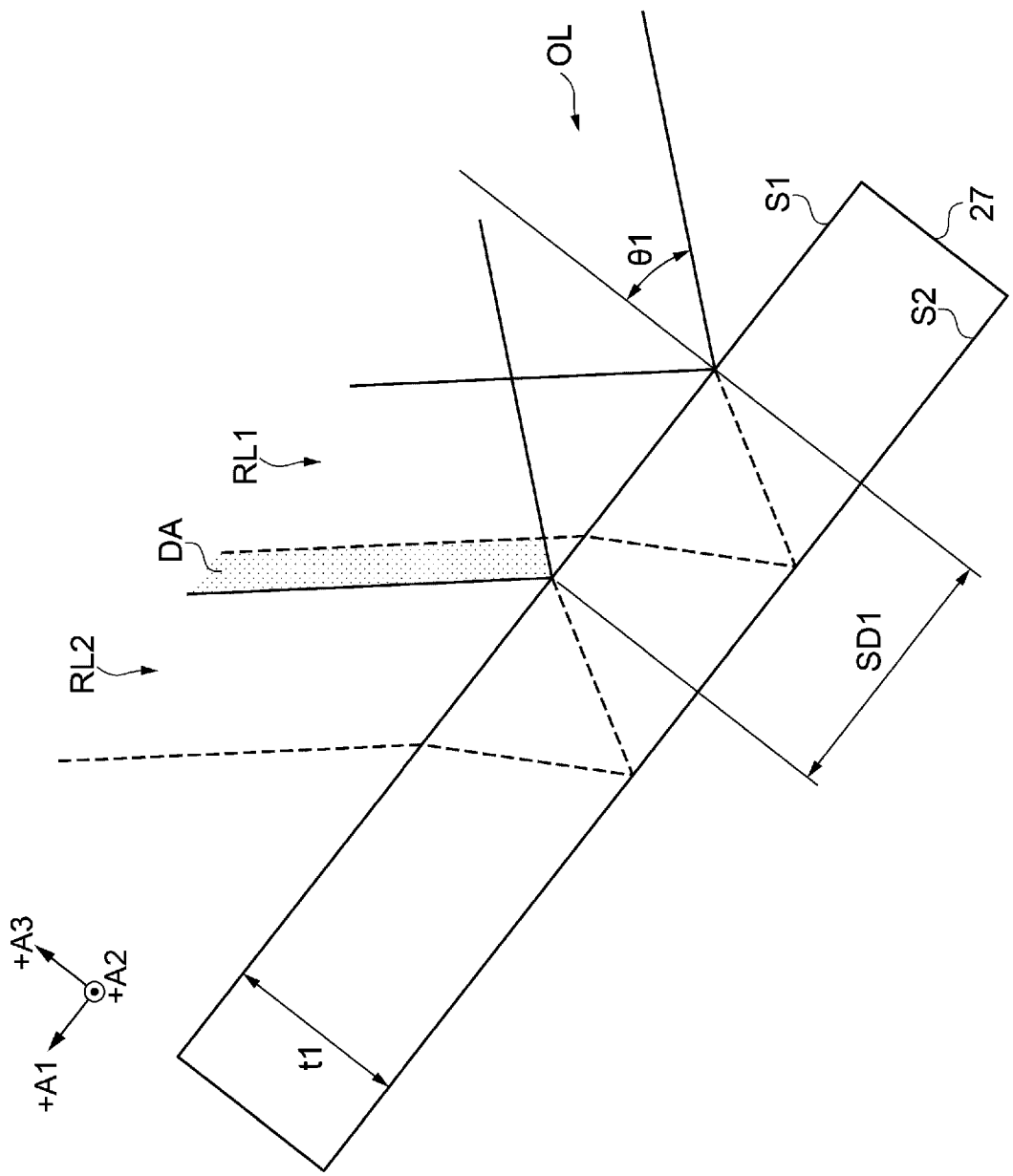
FIG. 6 is a diagram showing an enlarged configuration of reflected light near a light branching element.

FIG. 6 shows an enlarged configuration of the reflected light RL near of the light branching element 27. In FIG. 6, the laser light emitting element 11, the cover glass 5, the light receiving element 21, the condenser lens 25, the transmitted light TL, and the scattered light SL are omitted. FIG. 6 shows a schematic configuration of the front surface reflected light RL1 and the back surface reflected light RL2 near the light branching element 27. FIG. 6 shows a first entering angle θ1 of the emitted light OL, a first glass thickness t1 of the light branching element 27, a first spot diameter SD1, and an overlapping area DA.

The first entering angle θ1 of the emitted light OL is an angle at which the emitted light OL enters the front surface S1 of the light branching element 27. The first entering angle θ1 is an angle between the emitted light OL entering the light branching element 27 and an axis parallel to the third optical axis A3. The third optical axis A3 is an axis orthogonal to the first optical axis A1 and the second optical axis A2. The emitted light OL enters the front surface S1 of the light branching element 27 at the first entering angle θ1.

The first glass thickness t1 of the light branching element 27 is a thickness along the third optical axis A3 of the light branching element 27. The first glass thickness t1 is set in advance. The light branching element 27 is made of a light transmission material having the first glass thickness t1 and a first glass refractive index n1. The first glass thickness t1 corresponds to an example of a thickness t of the light transmission member. The first glass refractive index n1 corresponds to an example of a refractive index n of the light transmission member.

The first spot diameter SD1 is a diameter of the emitted light OL along the first optical axis A1. The first spot diameter SD1 is a diameter of the spot LS along the first optical axis A1 on the front surface S1 of the light branching element 27. The first spot diameter SD1 corresponds to an example of a first diameter D1 along the first axis.

The overlapping area DA is an area where the front surface reflected light RL1 and the back surface reflected light RL2 overlap. In the overlapping area DA, interference light of the front surface reflected light RL1 and the back surface reflected light RL2 is generated. The front surface reflected light RL1 and the back surface reflected light RL2 have different phases. Since the front surface reflected light RL1 and the back surface reflected light RL2 overlap each other, interference light having a frequency different from that of the emitted light OL is generated. When the interference light is received by the first light receiving element 21a, detection accuracy of the light detection signal decreases. The overlapping area DA is preferably set to be narrow.

Figure 7:
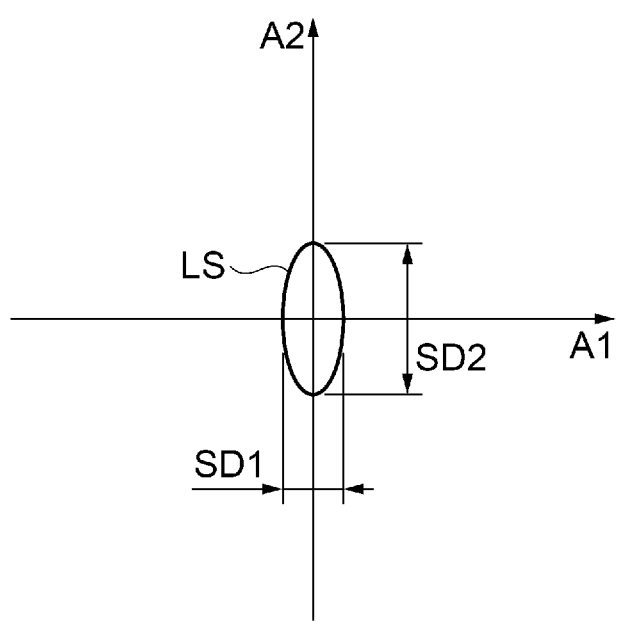
FIG. 7 is a diagram showing a schematic configuration of a spot on a front surface of the light branching element.

FIG. 7 shows a schematic configuration of the spot LS on the front surface S1 of the light branching element 27. FIG. 7 shows a shape of the spot LS of the laser light on the front surface S1. FIG. 7 shows the first spot diameter SD1 of the spot LS along the first optical axis A1 and a second spot diameter SD2 along the second optical axis A2.

The second spot diameter SD2 is a diameter of the emitted light OL along the second optical axis A2. The second spot diameter SD2 is a diameter of the spot LS along the second optical axis A2 on the front surface S1 of the light branching element 27. The second spot diameter SD2 corresponds to an example of a second diameter D2 along the second axis.

When the first spot diameter SD1 decreases, the overlapping area DA decreases. When the overlapping area DA decreases, the interference light of the front surface reflected light RL1 and the back surface reflected light RL2 decreases. The decrease in the detection accuracy of the light detection signal due to the interference light is prevented. On the other hand, when the first spot diameter SD1 decreases, light amounts of the reflected light RL and the scattered light SL decrease. When the light amounts of the reflected light RL and the scattered light SL decrease, the detection accuracy of the light detection signal decreases due to the decrease in the light amounts. The second spot diameter SD2 does not affect the overlapping area DA. Even when the second spot diameter SD2 increases, the detection accuracy of the light detection signal due to the interference light is unlikely to decrease. Accordingly, the first spot diameter SD1 and the second spot diameter SD2 have a relationship of SD1<SD2. Since the shape of the spot LS is not a circle but a shape in which the first spot diameter SD1 is smaller than the second spot diameter S2, the decrease in the detection accuracy of the light detection signal due to the interference light is prevented. Since the spot LS has the shape in which the second spot diameter SD2 is larger than the first spot diameter SD1, the decrease in the light amounts of the scattered light SL and the reflected light RL is prevented.

The measurement apparatus 100 includes the laser light emitting element 11 that emits laser light to the user M, the light branching element 27 that reflects a part of the laser light and separates the laser light into the reflected light RL and the transmitted light TL, the first light receiving element 21a that detects the reflected light RL, and the second light receiving element 21b that detects the scattered light SL generated when the transmitted light TL enters the user M. The light branching element 27 has the front surface S1 where the laser light enters and the back surface S2 where the laser light entering the front surface S1 enters. When a parallel axis parallel to the intersection line IL between the front surface S1 and the entering surface IS on which the laser light emitting element 11 and the first light receiving element 21a are disposed is defined as the first optical axis A1, and an orthogonal axis orthogonal to the first optical axis A1 on the front surface S1 is defined as the second optical axis A2, the first spot diameter SD1 of the laser light along the first optical axis A1 and the second spot diameter SD2 of the laser light along the second optical axis A2 have a relationship of SD1<SD2.

Since the shape of the spot LS of the laser light is not a circle but a shape in which the first spot diameter SD1 is smaller than the second spot diameter SD2, the decrease in the detection accuracy of the light detection signal due to the interference light is prevented. Since the spot LS has the shape in which the second spot diameter SD2 is larger than the first spot diameter SD1, the decrease in the light amounts of the scattered light SL and the reflected light RL is prevented.

The measurement apparatus 100 includes the differential amplifier 24 that receives the first electric signal obtained by the first light receiving element 21a receiving the reflected light RL and the second electric signal obtained by the second light receiving element 21b receiving the scattered light SL, and the data processing unit 33 that calculates the biological information using the light detection signal output from the differential amplifier 24.

The measurement apparatus 100 can obtain the biological information such as the blood volume using the light detection signal.

The measurement apparatus 100 includes the belt 2 that is attached to the housing 1 and is wound around the user M. The belt 2 is preferably attached parallel or substantially parallel to the arrangement direction of the laser light emitting element 11 and the second light receiving element 21b.

By disposing the laser light emitting element 11 and the second light receiving element 21b along the circumferential direction of the wrist of the user M, the decrease in the measurement accuracy due to a movement of the user M is prevented.

Figure 8:
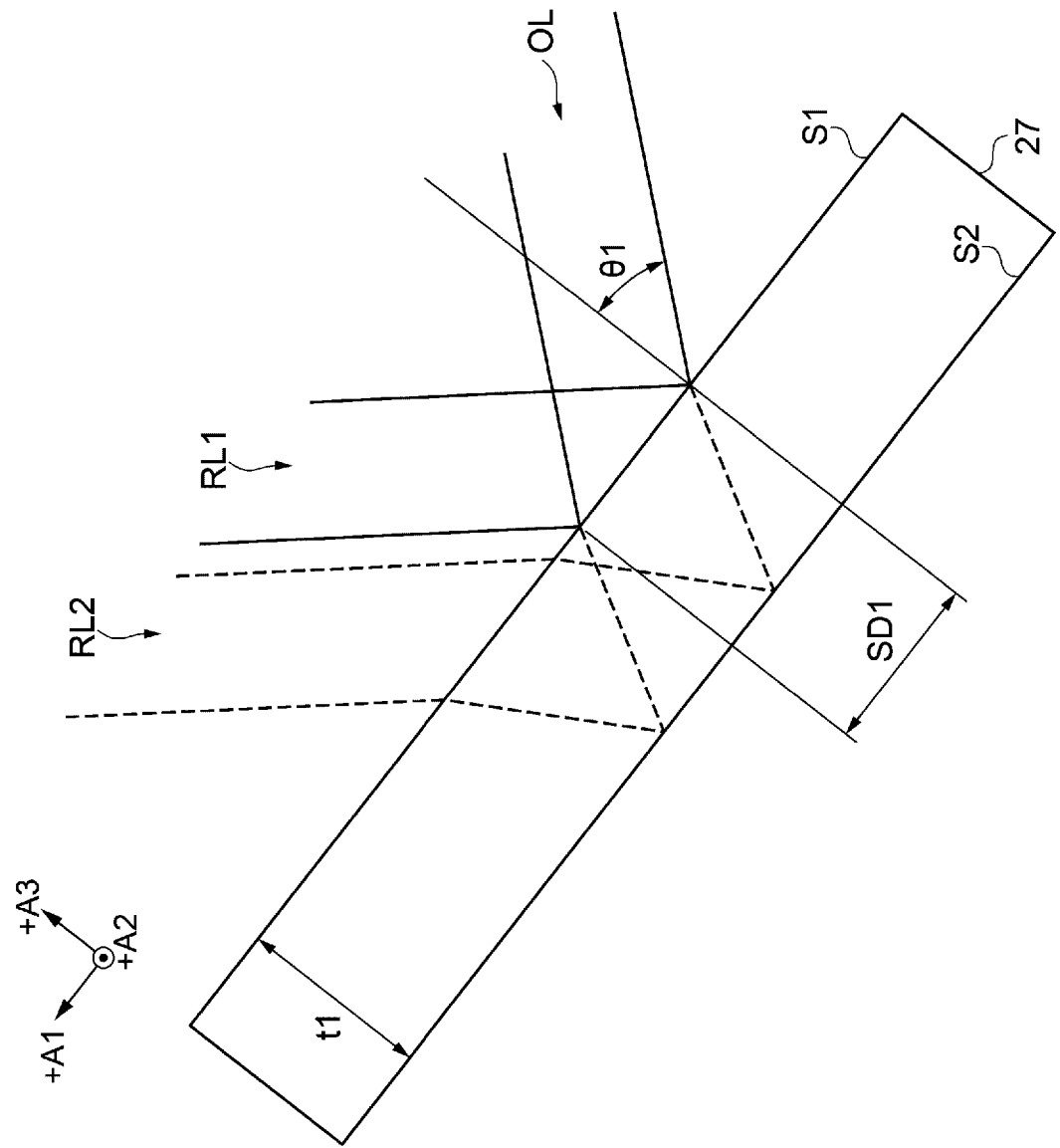
FIG. 8 is a diagram showing an enlarged configuration of the reflected light near the light branching element.

FIG. 8 shows an enlarged configuration of the reflected light RL near the light branching element 27. In FIG. 8, the laser light emitting element 11, the light receiving element 21, the condenser lens 25, the transmitted light TL, and the scattered light SL are omitted. FIG. 8 shows a schematic configuration of the front surface reflected light RL1 and the back surface reflected light RL2 near the light branching element 27. FIG. 8 shows the first entering angle θ1 of the emitted light OL, the first glass thickness t1 of the light branching element 27, and the first spot diameter SD1.

FIG. 8 shows a state in which the first spot diameter SD1 is set to satisfy a relationship of the following Formula (1).

$$SD1 < (t1 \times \sin\theta 1)/n1 \tag{1}$$

When the first spot diameter SD1 is a diameter having the relationship of Formula (1), the front surface reflected light RL1 and the back surface reflected light RL2 do not overlap each other as shown in FIG. 8. The overlapping area DA where the front surface reflected light RL1 and the back surface reflected light RL2 overlap is not formed. The interference light between the front surface reflected light RL1 and the back surface reflected light RL2 is prevented from being generated. The decrease in the detection accuracy of the light detection signal due to the interference light of the front surface reflected light RL1 and the back surface reflected light RL2 is further prevented.

It is preferable that first spot diameter SD1, the entering angle θ1 of the laser light to the front surface S1, the first glass thickness t1 of the light branching element 27, and the refractive index n1 of the light branching element 27 have a relationship of $$SD1 < (t1 \times \sin\theta 1)/n1.$$

The decrease in the detection accuracy of the light detection signal due to the interference light of the front surface reflected light RL1 and the back surface reflected light RL2 is further prevented.

Second Embodiment

A second embodiment shows a configuration using the detection unit 3 that detects reflected light RL reflected by the cover glass 5. In the second embodiment, the first light receiving element 21a receives the reflected light RL reflected by the cover glass 5. In the second embodiment, the light branching element 27 is not provided. The cover glass 5 functions as the light branching element 27 of the first embodiment.

Figure 9:
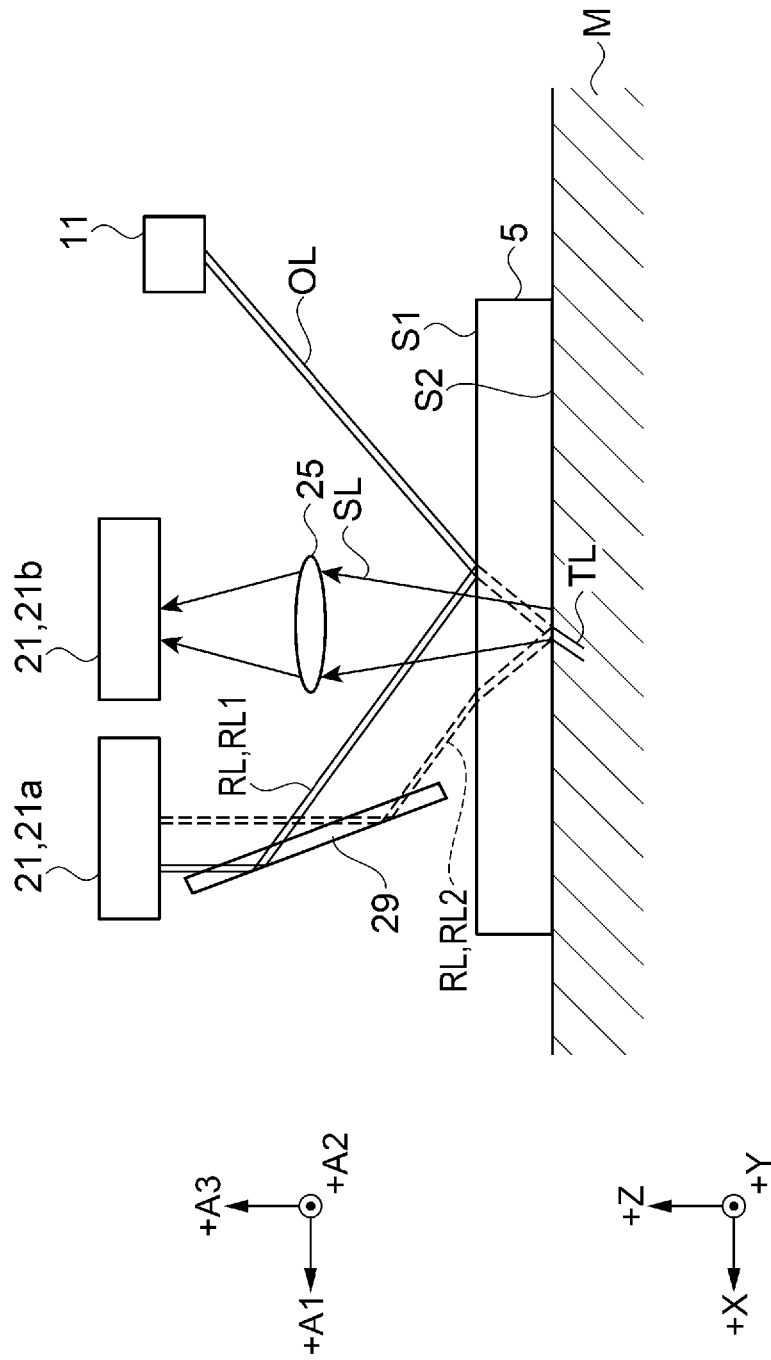
FIG. 9 is a diagram showing an outline of the optical measurement performed by the detection unit.

FIG. 9 shows an outline of an optical measurement performed by the detection unit 3. FIG. 9 shows the cover glass 5, the laser light emitting element 11, the first light receiving element 21a, the second light receiving element 21b, the condenser lens 25, and a reflection mirror 29. FIG. 9 shows the reflected light RL and the scattered light SL when the laser light emitting element 11 emits the emitted light OL toward the user M. FIG. 9 shows the emitted light OL, the reflected light RL, and the scattered light SL on the entering surface IS. The laser light emitting element 11, the first light receiving element 21a, and the second light receiving element 21b are arranged along the X-axis. The arrangement direction of the laser light emitting element 11, the first light receiving element 21a, and the second light receiving element 21b is parallel or substantially parallel to the X-axis.

The emitted light OL is emitted toward the measurement site of the user M by the laser light emitting element 11. The emitted light OL enters the cover glass 5. The emitted light OL is separated into the reflected light RL and the transmitted light TL by the cover glass 5. The emitted light OL is reflected by the front surface S1 and the back surface S2 of the cover glass 5.

The reflected light RL is light obtained by the emitted light OL being reflected by the cover glass 5. The reflected light RL includes the front surface reflected light RL1 and back surface reflected light RL2. The reflected light RL is reflected in the +Z direction. The reflected light RL is reflected toward the reflection mirror 29. The reflected light RL is reflected toward the first light receiving element 21a by the reflection mirror 29. The reflected light RL is received by the first light receiving element 21a.

The front surface reflected light RL1 is light obtained by the emitted light OL being reflected by the front surface S1 of the cover glass 5. The front surface reflected light RL1 is generated by a part of the emitted light OL being reflected by the front surface S1. The front surface reflected light RL1 is reflected toward the reflection mirror 29. The front surface reflected light RL1 is reflected toward the first light receiving element 21a by the reflection mirror 29. The front surface reflected light RL1 is received by the first light receiving element 21a.

The back surface reflected light RL2 is light obtained by the emitted light OL entering the front surface S1 being reflected by the back surface S2 of the cover glass 5. The back surface reflected light RL2 is generated by a part of the transmitted light TL entering the front surface S1 being reflected by the back surface S2. The back surface reflected light RL2 is reflected toward the reflection mirror 29. The back surface reflected light RL2 passes through an inside of the cover glass 5. The back surface reflected light RL2 is emitted to an outside from the front surface S1. The back surface reflected light RL2 is reflected toward the first light receiving element 21a by the reflection mirror 29. The back surface reflected light RL2 is received by the first light receiving element 21a.

The reflection mirror 29 reflects the reflected light RL toward the first light receiving element 21a. The reflection mirror 29 reflects the front surface reflected light RL1 and the back surface reflected light RL2 toward the first light receiving element 21a. The reflection mirror 29 is provided at a position through which the front surface reflected light RL1 and the back surface reflected light RL2 pass. By providing the reflection mirror 29, a degree of freedom of an arrangement position of the first light receiving element 21a is increased.

The transmitted light TL is light transmitted through the cover glass 5. The transmitted light TL is emitted toward the measurement site of the user M. The transmitted light TL transmits through the cover glass 5, and the measurement site of the user M is irradiated with the transmitted light TL.

The scattered light SL is generated by the measurement site of the user M being irradiated with the transmitted light TL. The scattered light SL is light reflected by living body tissue or red blood cells of the user M. The scattered light SL passes through the cover glass 5. The scattered light SL is condensed by the condenser lens 25. The condensed scattered light SL is received by the second light receiving element 21b.

The condenser lens 25 condenses the scattered light SL. The condenser lens 25 condenses the scattered light SL to increase a light intensity of the scattered light SL. FIG. 9 shows one condenser lens 25, but the present disclosure is not limited thereto. A plurality of condenser lenses 25 may be provided on an optical path of the scattered light SL.

The second light receiving element 21b receives the scattered light SL. The second light receiving element 21b receives the scattered light SL condensed by the condenser lens 25. The second light receiving element 21b generates the second electric signal by receiving the scattered light SL.

Figure 10:
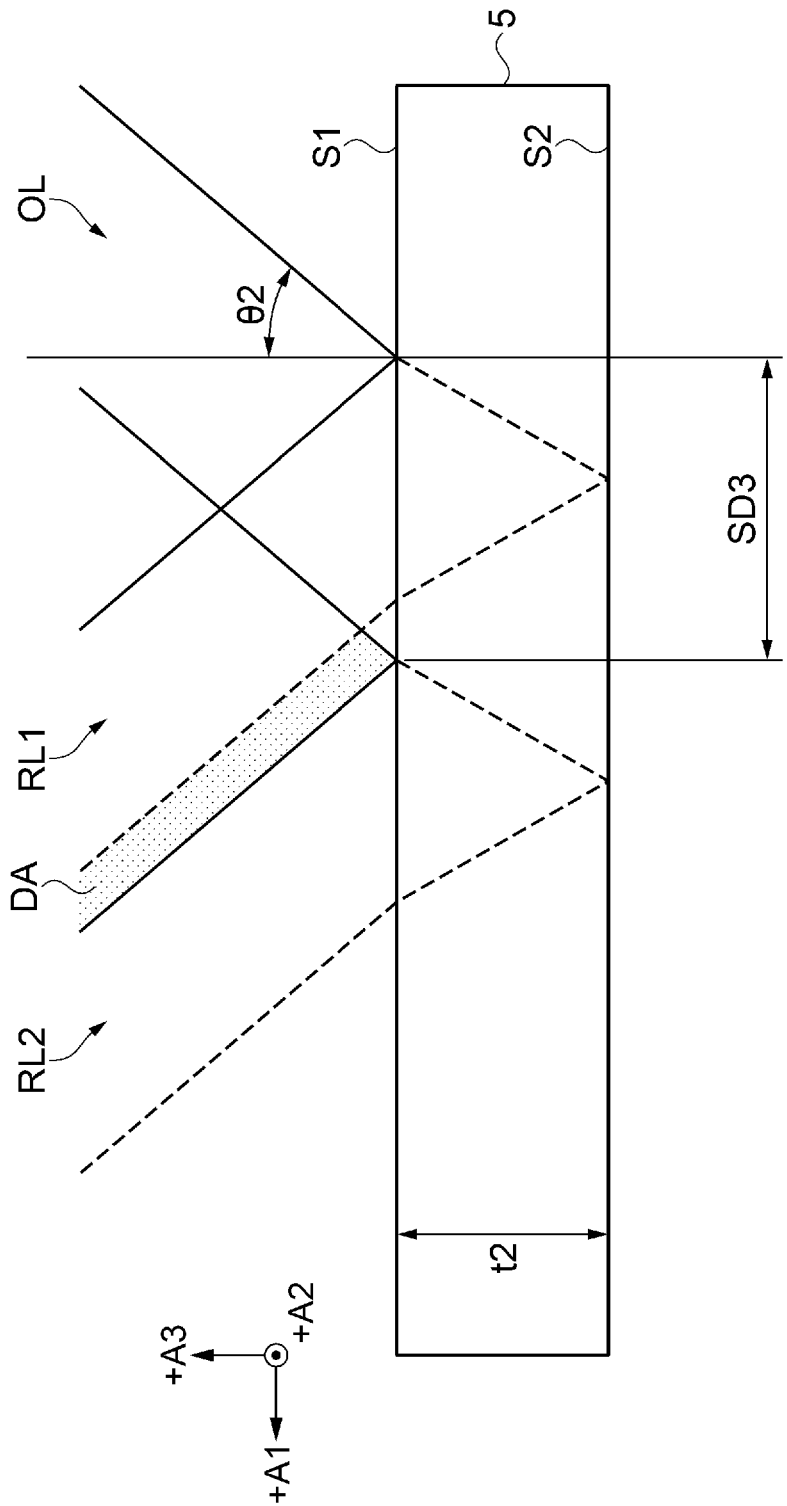
FIG. 10 is a diagram showing an enlarged configuration of reflected light near a cover glass.

FIG. 10 shows an enlarged configuration of the reflected light RL near of the cover glass 5. In FIG. 10, the laser light emitting element 11, the cover glass 5, the first light receiving element 21a, the second light receiving element 21b, the condenser lens 25, the reflection mirror 29, the transmitted light TL, and the scattered light SL are omitted. FIG. 10 shows a schematic configuration of the front surface reflected light RL1 and the back surface reflected light RL2 near the cover glass 5. FIG. 10 shows a second entering angle θ2 of the emitted light OL, a second glass thickness t2 of the cover glass 5, a third spot diameter SD3, and the overlapping area DA.

The second entering angle θ2 of the emitted light OL is an angle at which the emitted light OL enters the front surface S1 of the cover glass 5. The second entering angle θ2 is an angle between the emitted light OL entering the cover glass 5 and the axis parallel to the third optical axis A3. The emitted light OL enters the front surface S1 of the cover glass 5 at the second entering angle θ2.

The second glass thickness t2 of the cover glass 5 is a thickness of the cover glass 5 along the third optical axis A3. The second glass thickness t2 is set in advance. The cover glass 5 is made of a light transmission material having the second glass thickness t2 and a first glass refractive index n2. The second glass thickness t2 corresponds to an example of the thickness t of the light transmission member. The second glass refractive index n2 corresponds to an example of the refractive index n of the light transmission member.

The third spot diameter SD3 is a diameter of the emitted light OL along the first optical axis A1. The third spot diameter SD3 is a diameter of the spot LS on the front surface S1 of the cover glass 5 along the first optical axis A1. The third spot diameter SD3 corresponds to an example of the first diameter D1 along the first axis.

The overlapping area DA is an area where the front surface reflected light RL1 and the back surface reflected light RL2 overlap. In the overlapping area DA, interference light of the front surface reflected light RL1 and the back surface reflected light RL2 is generated. The front surface reflected light RL1 and the back surface reflected light RL2 have different phases. Since the front surface reflected light RL1 and the back surface reflected light RL2 overlap each other, interference light having a frequency different from that of the emitted light OL is generated. When the interference light is received by the first light receiving element 21a, detection accuracy of the light detection signal decreases. The overlapping area DA is preferably set to be narrow.

Figure 11:
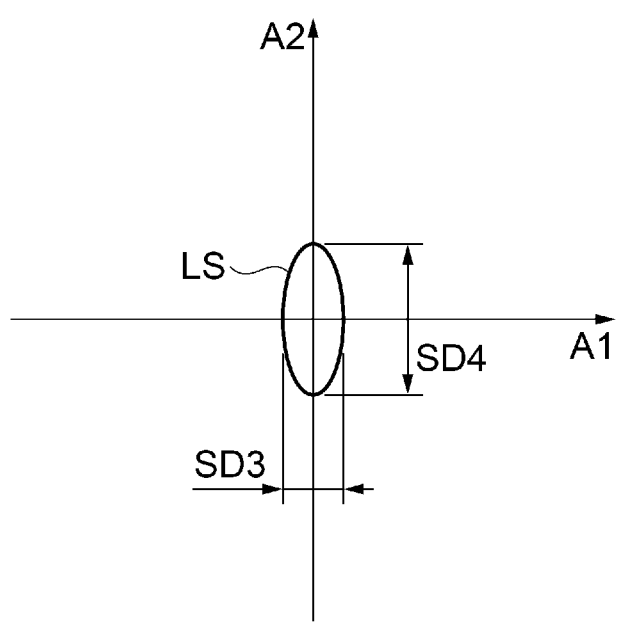
FIG. 11 is a diagram showing a schematic configuration of a spot on a front surface of the cover glass.

FIG. 11 shows a schematic configuration of the spot LS on the front surface S1 of the cover glass 5. FIG. 11 shows a shape of the spot LS of the laser light on the front surface S1. FIG. 11 shows the third spot diameter SD3 of the spot LS along the first optical axis A1 and a fourth spot diameter SD4 along the second optical axis A2.

The fourth spot diameter SD4 is a diameter of the emitted light OL along the second optical axis A2. The fourth spot diameter SD4 is a diameter of the spot LS on the front surface S1 of the cover glass 5 along the second optical axis A2. The fourth spot diameter SD4 corresponds to an example of the second diameter D2 along the second axis.

When the third spot diameter SD3 decreases, the overlapping area DA decreases. When the overlapping area DA decreases, the interference light of the front surface reflected light RL1 and the back surface reflected light RL2 decreases. The decrease in the detection accuracy of the light detection signal due to the interference light is prevented. On the other hand, when the third spot diameter SD3 decreases, light amounts of the reflected light RL and the scattered light SL decrease. When the light amounts of the reflected light RL and the scattered light SL decrease, the detection accuracy of the light detection signal decreases due to the decrease in the light amounts. The fourth spot diameter SD4 does not affect the overlapping area DA. Even when the fourth spot diameter SD4 increases, measurement accuracy of the light detection signal due to the interference light is unlikely to decrease. Accordingly, the third spot diameter SD3 and the fourth spot diameter SD4 have a relationship of SD3<SD4. Since the shape of the spot LS is not a circle but a shape in which the third spot diameter SD3 is smaller than the fourth spot diameter SD4, the decrease in the detection accuracy of the light detection signal due to the interference light is prevented. Since the spot LS has the shape in which the fourth spot diameter SD4 is larger than the third spot diameter SD3, the decrease in the light amounts of the scattered light SL and the reflected light RL is prevented.

The measurement apparatus 100 includes the laser light emitting element 11 that emits laser light to the user M, the cover glass 5 that reflects a part of the laser light and separates the laser light into the reflected light RL and the transmitted light TL, the first light receiving element 21a that detects the reflected light RL, and the second light receiving element 21b that detects the scattered light SL generated when the transmitted light TL enters the user M. The cover glass 5 has the front surface S1 where the laser light enters and the back surface S2 where the laser light entering the front surface S1 enters. When a parallel axis parallel to the intersection line IL between the front surface S1 and the entering surface IS on which the laser light emitting element 11 and the first light receiving element 21a are disposed is defined as the first optical axis A1, and an orthogonal axis orthogonal to the first optical axis A1 on the front surface S1 is defined as the second optical axis A2, the third spot diameter SD3 of the laser light along the first optical axis A1 and the fourth spot diameter SD4 of the laser light along the second optical axis A2 have a relationship of SD3<SD4.

Since the shape of the spot LS of the laser light is not a circle but a shape in which the third spot diameter SD3 is smaller than the fourth spot diameter SD4, the decrease in the detection accuracy of the light detection signal due to the interference light is prevented. Since the spot LS has the shape in which the fourth spot diameter SD4 is larger than the third spot diameter SD3, the decrease in the light amounts of the scattered light SL and the reflected light RL is prevented.

The measurement apparatus 100 includes the housing 1 that accommodates the laser light emitting element 11, the first light receiving element 21a, and the second light receiving element 21b. The housing 1 has the housing opening 1c at a position facing the user M, and the cover glass 5 is attached to the housing opening 1c.

Since the cover glass 5 has a function of separating the reflected light RL and the transmitted light TL, the light branching element 27 can be omitted.

Figure 12:
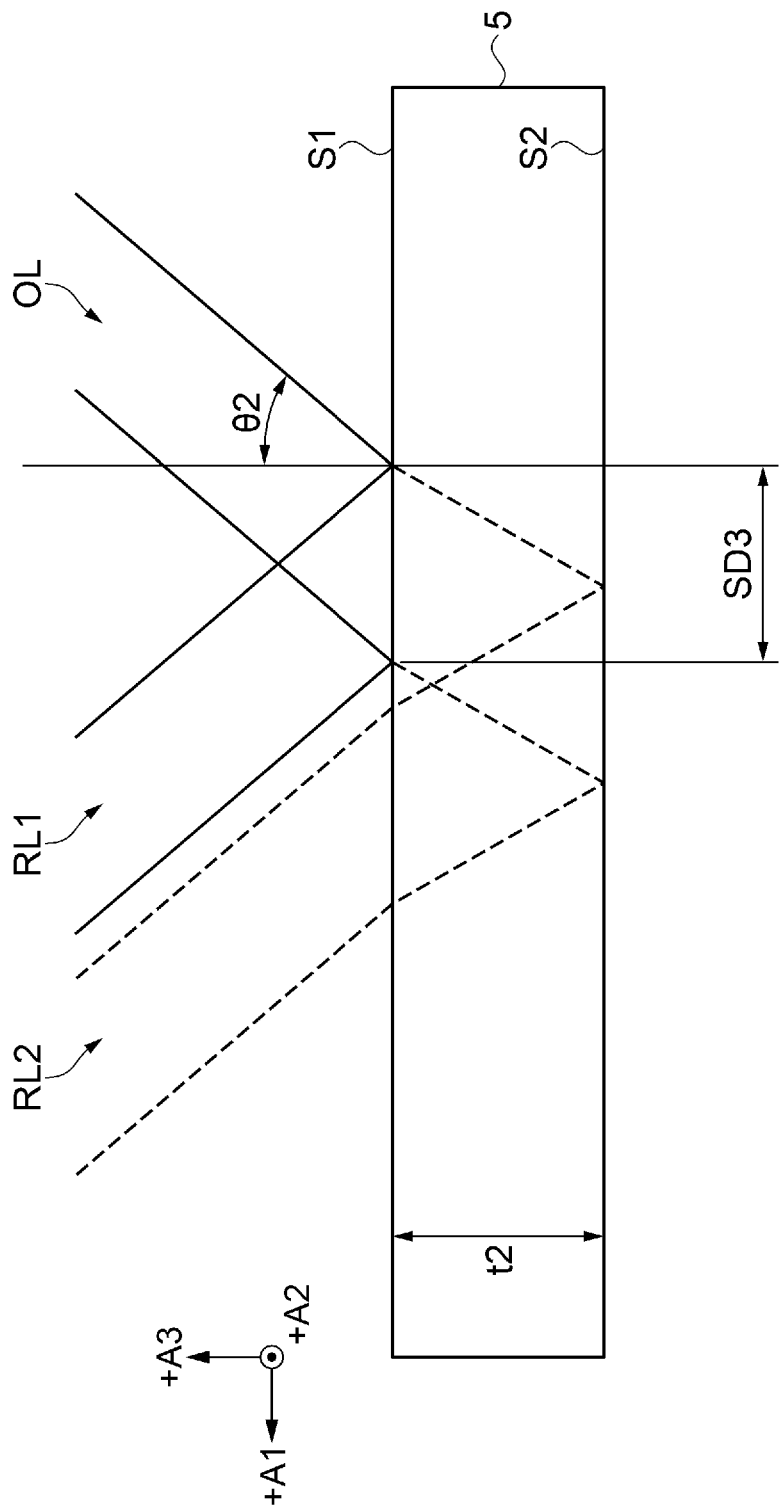
FIG. 12 is a diagram showing an enlarged configuration of the reflected light near the cover glass.

FIG. 12 shows an enlarged configuration of the reflected light RL near of the cover glass 5. In FIG. 12, the laser light emitting element 11, the first light receiving element 21a, the second light receiving element 21b, the condenser lens 25, the reflection mirror 29, the transmitted light TL, and the scattered light SL are omitted. FIG. 12 shows a schematic configuration of the front surface reflected light RL1 and the back surface reflected light RL2 near the cover glass 5. FIG. 12 shows the second entering angle θ2 of the emitted light OL, the second glass thickness t2 of the cover glass 5, and the third spot diameter SD3.

FIG. 12 shows a state in which the third spot diameter SD3 is set to satisfy a relationship of the following Formula (2).

$$SD3 < (t2 \times \sin\theta2)/n2 \qquad (2)$$

When the third spot diameter SD3 is a diameter having the relationship of Formula (2), the front surface reflected light RL1 and the back surface reflected light RL2 do not overlap each other as shown in FIG. 12. The overlapping area DA where the front surface reflected light RL1 and the back surface reflected light RL2 overlap is not formed. The interference light between the front surface reflected light RL1 and the back surface reflected light RL2 is prevented from being generated. The decrease in the detection accuracy of the light detection signal due to the interference light of the front surface reflected light RL1 and the back surface reflected light RL2 is further prevented.

Third Embodiment

A third embodiment shows a system in which the biological information is analyzed by a measurement system 1000. The measurement apparatus 100 transmits the light detection signal to the tablet terminal 200. The measurement apparatus 100 may transmit the first electric signal and the second electric signal to the tablet terminal 200. The tablet terminal 200 calculates the biological information using the light detection signal. Alternatively, the tablet terminal 200 calculates the biological information using the first electric signal and the second electric signal. The tablet terminal 200 analyzes the biological information and displays an analysis result on a display 210.

Figure 13:
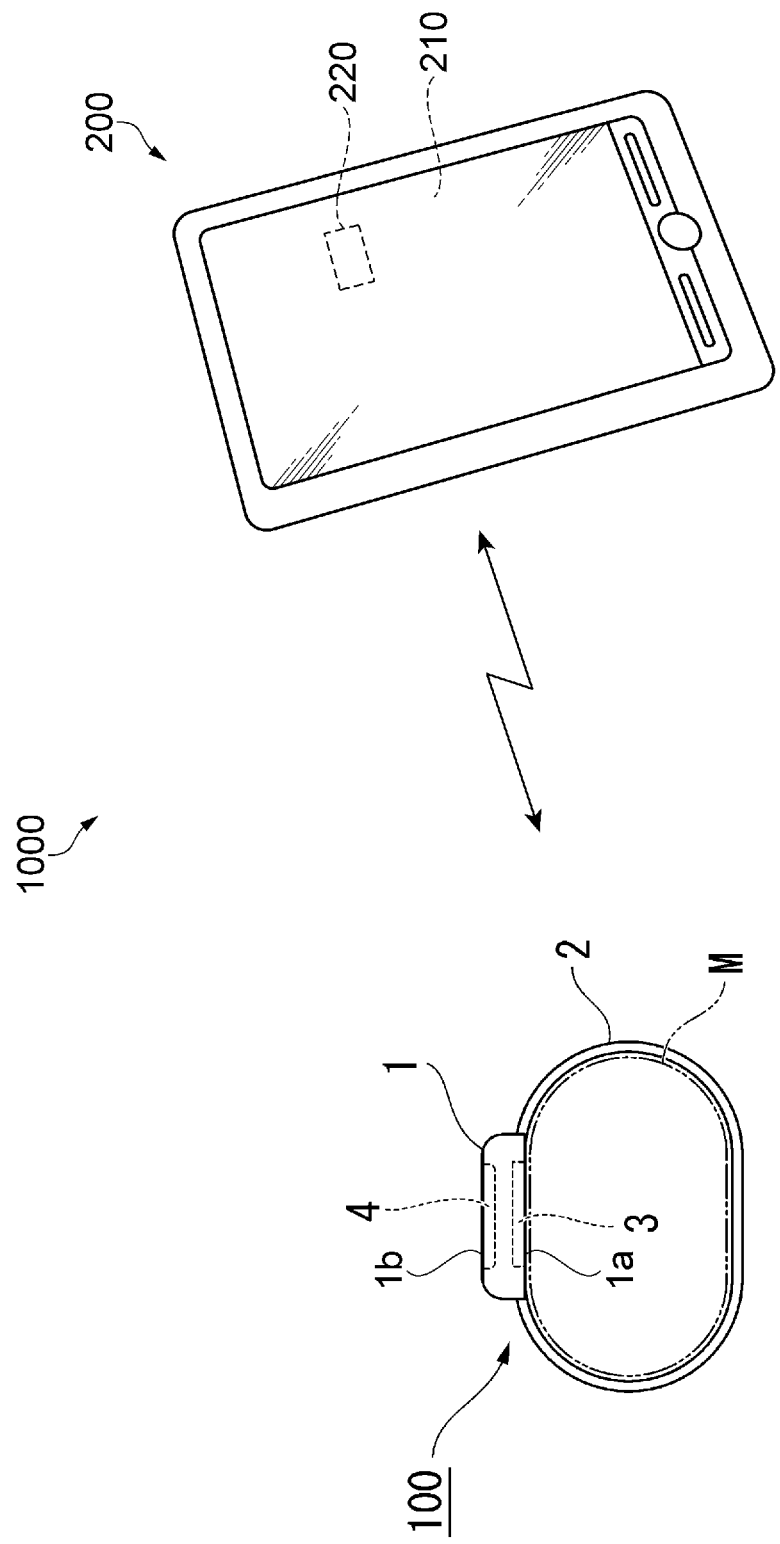
FIG. 13 is a diagram showing a schematic configuration of a measurement system.

FIG. 13 shows a schematic configuration of the measurement system 1000. The measurement system 1000 measures a blood flow, a blood volume, a blood flow rate, a pulse, and the like. The measurement system 1000 evaluates a heart rate, a blood pressure, and the like using a measurement result. As an example, the measurement system 1000 evaluates the blood pressure or the like using the blood flow as an index. The measurement system 1000 corresponds to an example of a biological information measurement system.

The measurement system 1000 includes the measurement apparatus 100 and the tablet terminal 200. The measurement apparatus 100 and the tablet terminal 200 are communicably connected. The measurement system 1000 shown in FIG. 13 performs wireless communication connection between the measurement apparatus 100 and the tablet terminal 200. The connection between the measurement apparatus 100 and the tablet terminal 200 is not limited to wireless. The measurement apparatus 100 and the tablet terminal 200 may be communicably connected by a wire. The tablet terminal 200 corresponds to an example of a control apparatus.

Figure 14:
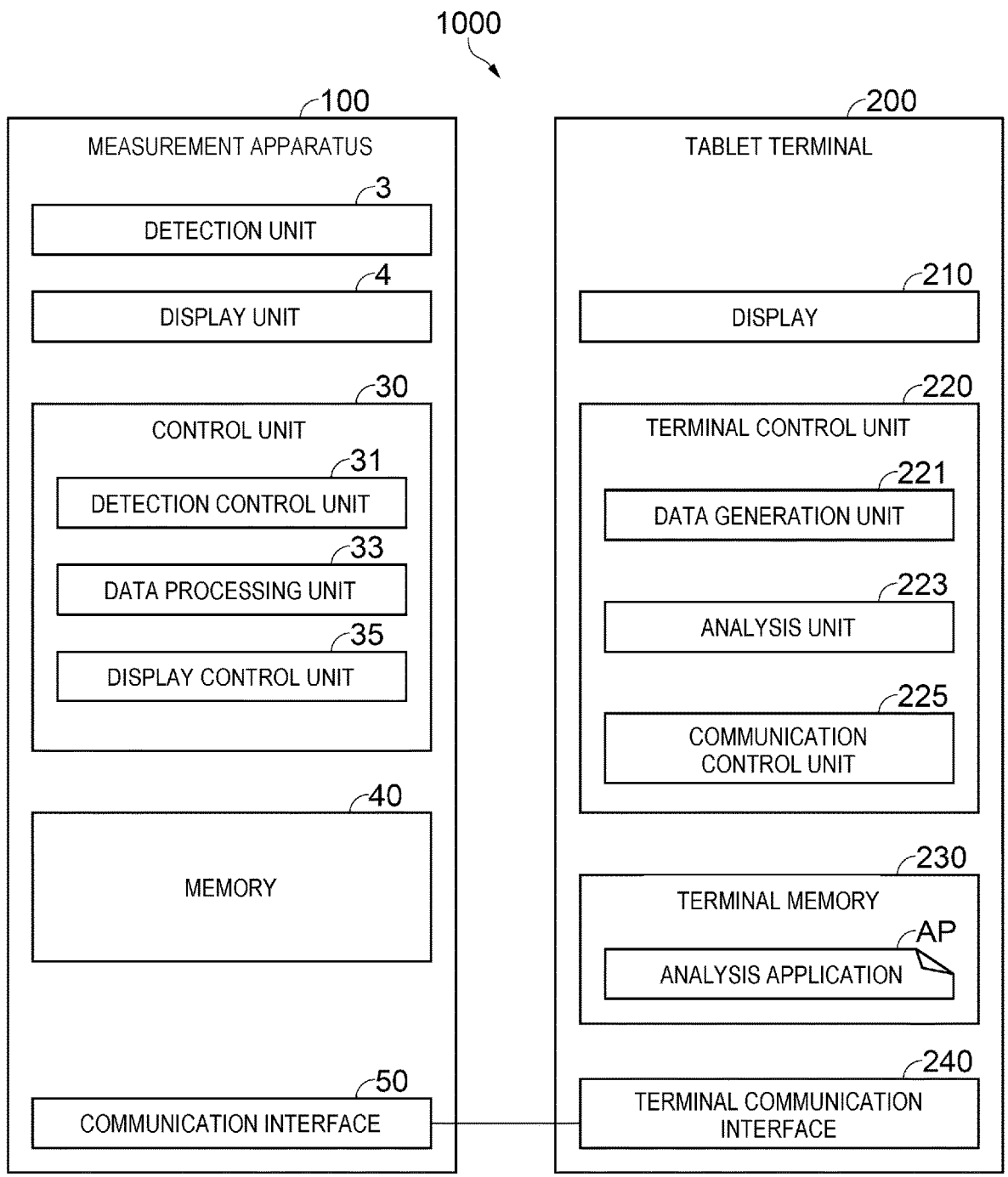
FIG. 14 is a diagram showing a block configuration of the measurement system.

FIG. 14 shows a block configuration of the measurement system 1000. The measurement system 1000 includes the measurement apparatus 100 and the tablet terminal 200. A configuration of the measurement apparatus 100 shown in FIG. 14 is the same as that of the measurement apparatus 100 shown in FIG. 3 except for the function of the data processing unit 33. The detection unit 3 of the measurement apparatus 100 includes the light branching element 27. An optical configuration of the measurement apparatus 100 is the same as the configuration shown in FIG. 5. The laser light emitting element 11 emits the laser light having the relationship of the first spot diameter SD1<the second spot diameter SD2 toward the user M. The laser light emitting element 11 may emit the laser light having the relationship of the above Formula (1) toward the user M.

The data processing unit 33 receives the light detection signal transmitted from the signal conversion unit 23. The data processing unit 33 transmits the light detection signal to the tablet terminal 200 via the communication interface 50. The data processing unit 33 transmits the light detection signal to the tablet terminal 200 at a predetermined timing. The data processing unit 33 may transmit a plurality of light detection signals as a light detection signal group to the tablet terminal 200. The data processing unit 33 may receive an electric signal from the signal conversion unit 23 and transmit the electric signal to the tablet terminal 200.

The tablet terminal 200 can calculate the biological information such as the blood volume. The tablet terminal 200 analyzes the biological information. The tablet terminal 200 analyzes a health condition of the user M based on the biological information. The tablet terminal 200 includes the display 210, a terminal control unit 220, a terminal memory 230, and a terminal communication interface 240.

The terminal control unit 220 is a terminal controller that controls operations of various units in the tablet terminal 200. The terminal control unit 220 analyzes the biological information of the user M. The terminal control unit 220 is, for example, a terminal processor including a CPU. The terminal control unit 220 is implemented by one or more processors. The terminal control unit 220 may include a semiconductor memory such as a RAM or a ROM. The semiconductor memory functions as a work area of the terminal control unit 220. The terminal control unit 220 functions as a data generation unit 221, an analysis unit 223, and a communication control unit 225 by executing an analysis application AP stored in the terminal memory 230. The terminal control unit 220 corresponds to an example of an analysis unit.

The data generation unit 221 is a functional unit that operates in the terminal control unit 220. The data generation unit 221 calculates the biological information such as the blood volume. When the data generation unit 221 acquires the light detection signal from the measurement apparatus 100, the data generation unit 221 calculates the biological information using the light detection signal. The data generation unit 221 has the same function as the data processing unit 33 of the first embodiment and calculates the biological information. The data generation unit 221 outputs the biological information to the analysis unit 223.

The analysis unit 223 is a functional unit that operates in the terminal control unit 220. The analysis unit 223 acquires the biological information output from the data generation unit 221. The analysis unit 223 analyzes the biological information to analyze the health condition of the user M. The analysis unit 223 outputs an analysis result of the biological information to the display 210. The analysis unit 223 may store the analysis result in the terminal memory 230. The analysis unit 223 may generate chart data using the biological information. The analysis unit 223 outputs the generated chart data to the display 210. The display 210 displays various charts based on the chart data.

The communication control unit 225 is a functional unit that operates in the terminal control unit 220. The communication control unit 225 controls communication with the measurement apparatus 100. The communication control unit 225 establishes a communication connection with the measurement apparatus 100. The communication control unit 225 causes the measurement apparatus 100 to transmit the light detection signal or the light detection signal group at a predetermined timing. The communication control unit 225 may cause the measurement apparatus 100 to transmit the electric signal at a predetermined timing.

The terminal memory 230 stores various data. The terminal memory 230 stores control data for operating various units in the tablet terminal 200. The terminal memory 230 may store various analysis data analyzed by the terminal control unit 220. The terminal memory 230 stores the analysis application AP operating in the terminal control unit 220.

The analysis application AP operates various functional units by being executed by the terminal control unit 220. The analysis application AP operates the terminal control unit 220 as the data generation unit 221, the analysis unit 223, and the communication control unit 225. The analysis application AP may operate the terminal control unit 220 as a functional unit other than the data generation unit 221, the analysis unit 223, and the communication control unit 225.

The terminal communication interface 240 is a terminal interface circuit communicably connected with the measurement apparatus 100. The terminal communication interface 240 is connected to the measurement apparatus 100 in a wired or wireless manner according to a predetermined protocol. The terminal communication interface 240 includes, for example, a connection port for wired communication, an antenna for wireless communication, and the like. The terminal communication interface 240 receives the light detection signal or the light detection signal group. The terminal communication interface 240 transmits various control data for controlling the operations of the measurement apparatus 100, information related to the user M, and the like to the measurement apparatus 100. The terminal communication interface 240 may be communicably connected to an external apparatus other than the measurement apparatus 100. The terminal communication interface 240 corresponds to an example of a terminal communication unit.

The measurement system 1000 includes the measurement apparatus 100 and the tablet terminal 200. The measurement apparatus 100 includes the laser light emitting element 11 that emits the laser light to the user M, the light branching element 27 that reflects a part of the laser light and separates the laser light into the reflected light RL and the transmitted light TL, the first light receiving element 21a that detects the reflected light RL and generates the first electric signal, the second light receiving element 21b that detects the scattered light SL generated when the transmitted light TL enters the user M and generates the second electric signal, the differential amplifier 24 that receives the first electric signal and the second electric signal and generates the light detection signal, and the communication interface 50 that transmits the light detection signal. The tablet terminal 200 includes the terminal communication interface 240 that receives the light detection signal, and the terminal control unit 220 that analyzes the biological information of the user M using the light detection signal. The light branching element 27 has the front surface S1 where the laser light enters and the back surface S2 where the laser light entering the front surface S1 enters. When a parallel axis parallel to the intersection line IL between the front surface S1 and the entering surface IS on which the laser light emitting element 11 and the first light receiving element 21a are disposed is defined as the first optical axis A1, and an orthogonal axis orthogonal to the first optical axis A1 on the front surface S1 is defined as the second optical axis A2, the first spot diameter SD1 of the laser light along the first optical axis A1 and the second spot diameter SD2 of the laser light along the second optical axis A2 have a relationship of SD1<SD2.

Since the shape of the spot LS of the laser light is not a circle but a shape in which the first spot diameter SD1 is smaller than the second spot diameter SD2, the decrease in the detection accuracy of the light detection signal due to the interference light is prevented. Since the spot LS has the shape in which the second spot diameter SD2 is larger than the first spot diameter SD1, the decrease in the light amounts of the scattered light SL and the reflected light RL is prevented.

What is claimed is:

1. A biological information measurement apparatus comprising:
    a light emitting diode (LED) configured to emit laser light to a living body;
    a light transmission member configured to reflect a part of the emitted laser light;
    a first photodiode configured to detect the reflected part of the emitted laser light; and
    a second photodiode configured to detect scattered light generated when the emitted laser light enters the living body, wherein
    the light transmission member has a surface,
    the LED and the first photodiode are on an entering surface,
    the entering surface intersects the surface of the light transmission member at an intersection line,
    D1<D2,
    a parallel axis parallel to the intersection line is defined as a first axis,
    an orthogonal axis orthogonal to the first axis on the surface of the light transmission member is defined as a second axis,
    D1 is a first diameter of the emitted laser light along the first axis,
    D2 is a second diameter of the emitted laser light along the second axis, $D1 < (t \times \sin \theta)/n$, θ is an entering angle of the laser light to the surface of the light transmission member, t is a thickness of the light transmission member, and n is a refractive index of the light transmission member.

2. The biological information measurement apparatus according to claim 1, further comprising:
   a differential circuit configured to receive a first detection signal obtained by the first photodiode and a second detection signal obtained by the second photodiode; and
   a central processing unit (CPU) configured to calculate biological information using an output signal output from the differential circuit.

3. The biological information measurement apparatus according to claim 1, further comprising a case configured to accommodate the LED, the first photodiode, and the second photodiode, wherein
   the case has a passage opening at a position facing the living body, and
   the light transmission member is attached to the passage opening.

4. The biological information measurement apparatus according to claim 3, further comprising a band to be attached to the case and wound around the living body, wherein
   the band is attached parallel or substantially parallel to an arrangement direction of the LED and the second photodiode.

5. A biological information measurement system comprising:
   a biological information measurement apparatus including:
      a light emitting diode (LED) configured to emit laser light to a living body;
      a light transmission member configured to reflect a part of the emitted laser light;
      a first photodiode configured to:
         detect the reflected part of the emitted laser light; and
         generate a first detection signal based on the detection of the reflected part of the emitted laser light;
      a second light photodiode configured to:
         detect scattered light generated when the emitted laser light enters the living body; and
         generate a second detection signal based on the detected scattered light;
      a differential circuit configured to:
         receive the first detection signal;
         receive the second detection signal; and
         generate an output signal based on the received first detection signal and the received second detection signal; and
      a communication interface configured to transmit the output signal; and
   a control apparatus including:
      a terminal communication interface configured to receive the output signal; and
      a central processing unit (CPU) configured to analyze biological information of the living body using the output signal, wherein
      the light transmission member has a surface,
      the LED and the first photodiode are on an entering surface,
      the entering surface intersects the surface of the light transmission member at an intersection line,
      $D1 < D2$,
      a parallel axis parallel to the intersection line is defined as a first axis,
      an orthogonal axis orthogonal to the first axis on the surface of the light transmission member is defined as a second axis,
      D1 is a first diameter of the emitted laser light along the first axis,
      D2 is a second diameter of the emitted laser light along the second axis,
      $D1 < (t \times \sin \theta)/n$,
      θ is an entering angle of the laser light to the surface of the light transmission member,
      t is a thickness of the light transmission member, and
      n is a refractive index of the light transmission member.

\* \* \* \* \*